US012646730B2

(12) United States Patent
Lee

(10) Patent No.: US 12,646,730 B2
(45) Date of Patent: Jun. 2, 2026

(54) FUEL CELL SYSTEM AND METHOD OF CONTROLLING SAME

(71) Applicants: HYUNDAI MOTOR COMPANY, Seoul (KR); KIA CORPORATION, Seoul (KR)

(72) Inventor: Yong Hee Lee, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 781 days.

(21) Appl. No.: 18/085,055

(22) Filed: Dec. 20, 2022

(65) Prior Publication Data

US 2024/0105978 A1     Mar. 28, 2024

(30) Foreign Application Priority Data

Sep. 26, 2022    (KR) ........................ 10-2022-0121664

(51) Int. Cl.
*H01M 8/04701*          (2016.01)

(52) U.S. Cl.
CPC ... *H01M 8/04708* (2013.01); *H01M 8/04738* (2013.01)

(58) Field of Classification Search
CPC . H01M 8/04708; H01M 8/04738; F28C 3/06; F28D 2021/0043; F28D 5/00
See application file for complete search history.

(56) References Cited

U.S. PATENT DOCUMENTS

| | | | |
|---|---|---|---|
| 10,897,054 B2 | 1/2021 | Tokunaga | |
| 11,450,873 B2 | 9/2022 | Won et al. | |

| | | | |
|---|---|---|---|
| 2002/0134540 A1* | 9/2002 | Ieda | B60H 1/00842 165/204 |
| 2008/0239776 A1 | 10/2008 | Mance et al. | |
| 2018/0277870 A1 | 9/2018 | Tokunaga | |
| 2021/0249673 A1* | 8/2021 | Hayashi | H01M 8/04029 |
| 2022/0209265 A1 | 6/2022 | Won et al. | |

FOREIGN PATENT DOCUMENTS

| | | | |
|---|---|---|---|
| CN | 101275068 A | 10/2008 | |
| CN | 113540521 A * | 10/2021 | H01M 8/04723 |
| DE | 10 2018 103 852 A1 | 9/2018 | |
| EP | 4024539 A1 | 7/2022 | |

OTHER PUBLICATIONS

Extended European Search Report dated Jun. 25, 2024, issued in corresponding European Patent Application No. 22214545.0.

* cited by examiner

*Primary Examiner* — Allison Bourke
*Assistant Examiner* — Kayla Elaine Clary
(74) *Attorney, Agent, or Firm* — MORGAN, LEWIS & BOCKIUS LLP

(57)          ABSTRACT

According to an embodiment disclosed herein, a fuel cell system includes a cooling line through which cooling water passing through a plurality of electronic parts circulates and in which a wire for supplying power to the plurality of electronic parts is disposed, a pump that is connected to the cooling line and pumps the cooling water, a cooling fan that cools the cooling water, and a controller that determines a control mode based on a temperature of the wire and controls the number of rotations of the pump and the number of rotations of the cooling fan based on the control mode.

16 Claims, 7 Drawing Sheets

FUEL CELL SYSTEM AND METHOD OF CONTROLLING SAME

CROSS-REFERENCE TO RELATED APPLICATION

This application claims the benefit of priority to Korean Patent Application No. 10-2022-0121664, filed in the Korean Intellectual Property Office on Sep. 26, 2022, the entire contents of which are incorporated herein by reference.

TECHNICAL FIELD

The present disclosure relates to a fuel cell system and a method of controlling the same.

BACKGROUND

Fuel cell systems may generate electric energy using fuel cell stacks. For example, when hydrogen is used as a fuel for the fuel cell stack, the fuel cell stack may be alternative to solving global environmental problems, and thus R&D on the fuel cell systems has been continuously carried out.

The fuel cell system may include a fuel cell stack that generates electrical energy, a fuel supply device that supplies a fuel (hydrogen) to the fuel cell stack, an air supply device that supplies, to the fuel cell stack, oxygen in the air, which is an oxidizing agent required for electrochemical reaction, and a thermal management system (TMS) that removes reaction heat of the fuel cell stack to the outside of the system, controls an operating temperature of the fuel cell stack, and performs a water management function.

SUMMARY

The present disclosure has been made to solve the above-mentioned problems occurring in the prior art while advantages achieved by the prior art are maintained intact.

In general, in the case of a fuel cell system, electronic parts connected to the fuel cell system generate heat, and a thermal management system passing through the electronic parts is provided to manage the generated heat.

However, in the case of a non-vehicle such as a construction machine, a voltage specification of a load terminal of an electrical component is frequently low as compared to a normal vehicle, and thus in a power conversion device, a high amount of heat is generated due to a high current in an output terminal wire. Further, in the non-vehicle, since a sudden change in output occurs frequently, a change in a current is large, and accordingly, a rapid increase in the amount of heat occurs frequently.

Accordingly, a non-negligible amount of heat is generated in a wire for supplying power to the electronic part, this may affect the performance of a fuel cell, and thus a method of more effectively manage the heat of the wire is required.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided a fuel cell system including a cooling line through which cooling water passing through a plurality of electronic parts circulates and in which a wire for supplying power to the plurality of electronic parts is disposed, a pump that is connected to the cooling line and pumps the cooling water, a cooling fan that cools the cooling water, and a controller that determines a control mode based on a temperature of the wire and controls the number of rotations of the pump and the cooling fan based on the control mode.

According to another aspect of the present disclosure, there is provided a method of controlling a fuel cell system, the method including determining a control mode based on a temperature of a wire disposed inside a cooling line through which cooling water passing through a plurality of electronic parts circulates and a temperature of the wire that supplies power to the plurality of electronic parts, and controlling the number of rotations of a pump that pumps the cooling water and the number of rotations of a cooling fan that cools the cooling water based on the control mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
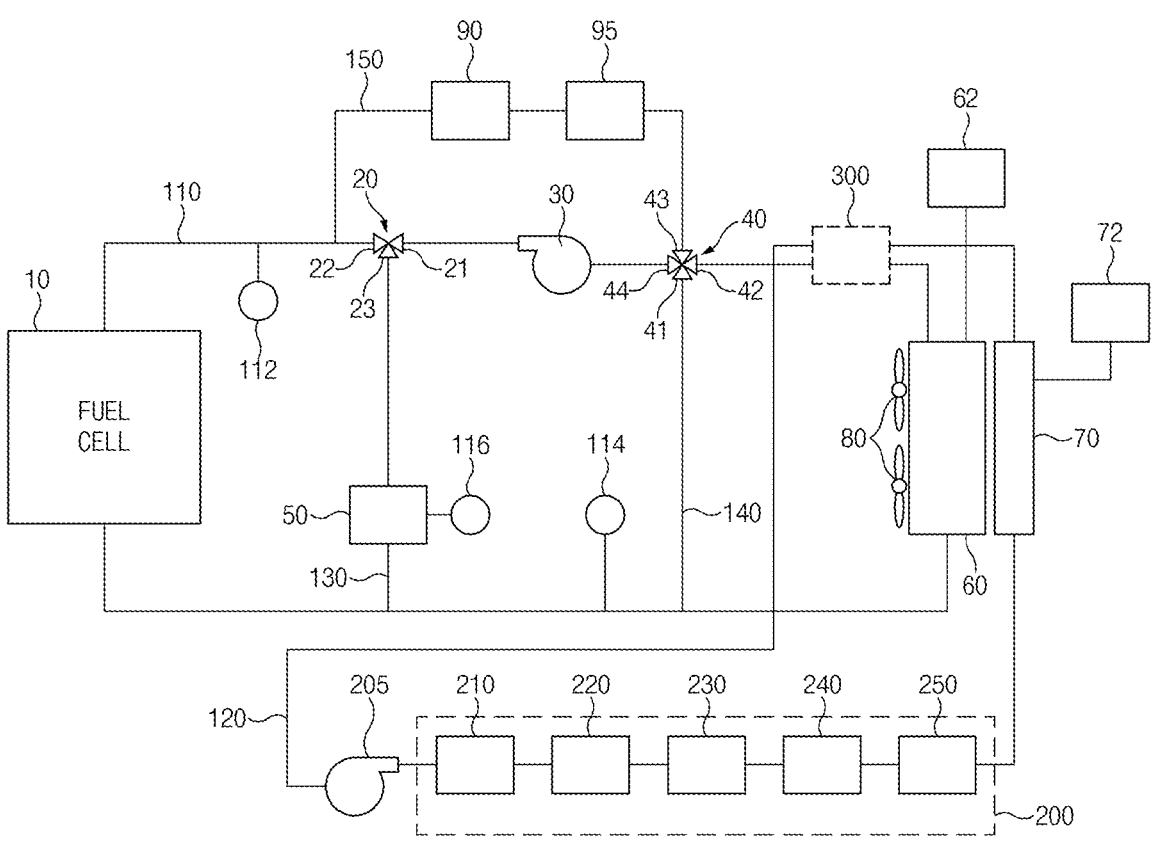
FIGS. 1 and 2 are views illustrating a fuel cell system according to various the embodiments.

Hereinafter, various embodiments of the present disclosure will be described with reference to the accompanying drawings. However, it should be understood that the present disclosure is not limited to specific embodiments and includes various modifications, equivalents, and/or alternatives of the embodiments of the present disclosure.

In the present disclosure, a singular form of a noun corresponding to an item may include one or more of items unless the relevant context clearly indicates otherwise. In the present disclosure, phrases such as "A or B," "at least one of A and B," "at least one of A or B," "A, B, or C," "at least one of A, B, and C," and "at least one of A, B, or C" may include any one of the items listed together in a corresponding one of the phrases or all possible combinations thereof. Such terms as "first" and "second" or "1st" and "2nd" may be used to simply distinguish a corresponding component from another corresponding component, and does not limit the components in other aspects (for example, importance or order). When it is referenced that a component (for example, a first component) is "coupled with" or "connected with" another component (for example, a second component) with or without the term "operatively" or "communicatively", this means that the component may be connected with the another component directly (for example, in a wired manner), wirelessly, or via a third component.

Each component (for example, a module or a program) of components described in the present disclosure may include a singular or a plurality of entities. According to various embodiments, one or more components or operations among the above-described components may be omitted or one or more other components or operations may be added. Alternatively or additionally, the plurality of components (for example, modules or programs) may be integrated into one component. In this case, the integrated component may perform one or more functions of respective components of the plurality of components in a manner that is the same as or similar to the functions performed by the corresponding component among the plurality of components before the integration. According to various embodiments, operations performed by modules, programs, or other components may be executed sequentially, parallelly, repeatedly, or heuristically, one or more of the operations may be executed in a different order or omitted, or one or more other operations may be added.

Terms "module" or "unit" used herein may include a unit implemented in hardware, software, or firmware, and may be used interchangeably with terms such as logic, a logic block, a component, or a circuit. The module may be an integrally formed component or a minimum unit or a part of the component performing one or more functions. For example, according to an embodiment, the module may be implemented in the form of an application-specific integrated circuit (ASIC).

Various embodiments of the present specification may be implemented by software (for example, a program or an application) including one or more instructions stored in a storage medium (for example, a memory) that may be read by a machine. For example, a processor of the machine may call at least one instruction among one or more instructions stored in the storage medium and may execute the instruction. This enables at least one function to be performed according to the at least one called instruction. The one or more instructions may include a code that is generated by a compiler or a code that may be executed by an interpreter. The storage medium that may be read by the machine may be provided in the form of a non-transitory storage medium. Here, the "non-transitory storage medium" merely means that the storage medium is a tangible device and does not include a signal (for example, an electromagnetic wave), and with regard to the term, a case in which data is semi-permanently stored in the storage medium and a case in which data is temporarily stored in the storage medium are not distinguished from each other.

Figure 2:
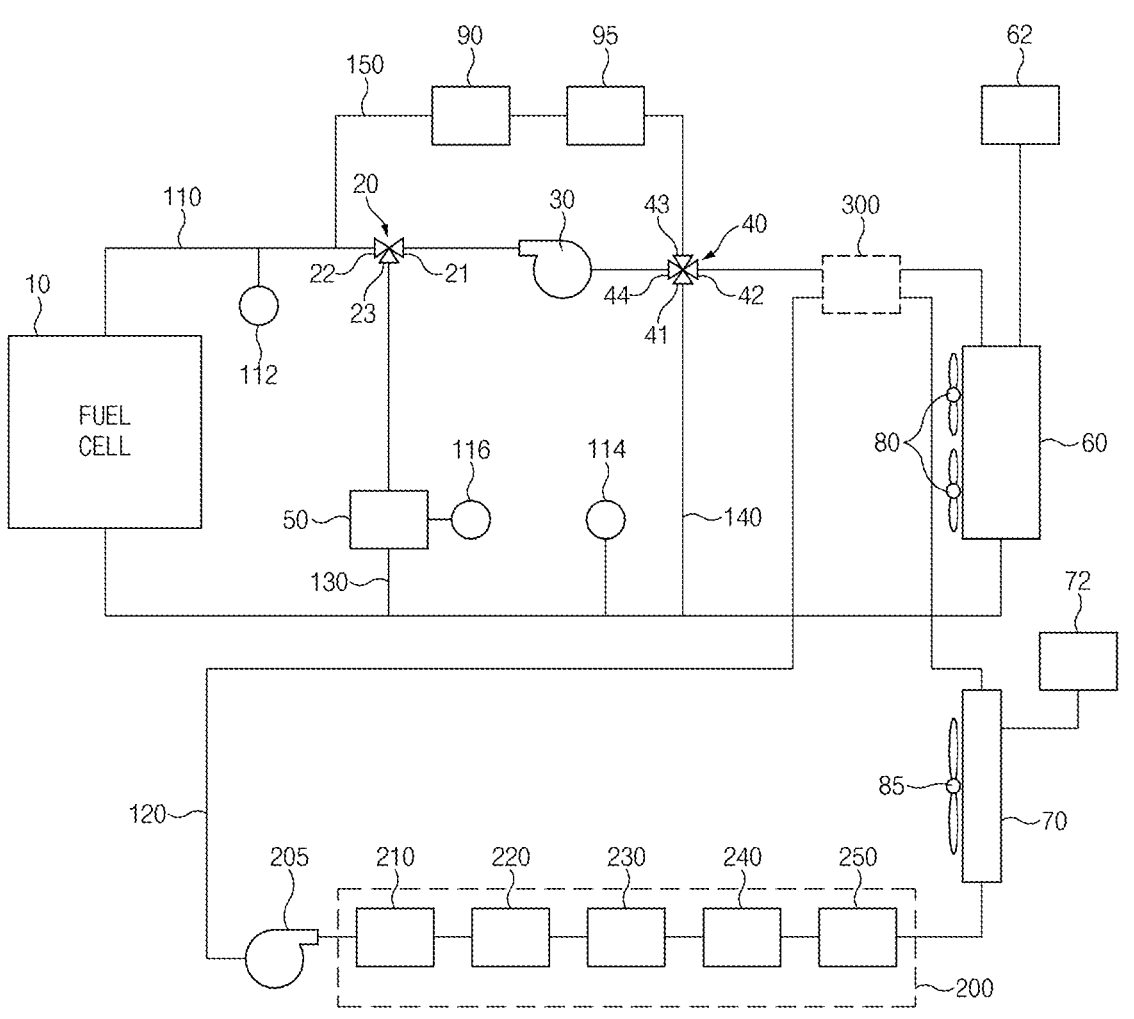

FIGS. 1 and 2 are views illustrating a fuel cell system according to various the embodiments.

Referring to FIG. 1, a vehicle fuel cell system may include a first cooling line 110 through which first cooling water passing through a fuel cell stack 10 of a vehicle circulates, a second cooling line 120 through which second cooling water passing through power electronic parts 200 of the vehicle circulates, and a heat exchanger 300 that mutually exchanges heat between the first cooling water and the second cooling water. The first cooling line 110 and the second cooling line 120 may constitute a thermal management system (TMS) line through which the first cooling water and the second cooling water may flow while heat is exchanged therebetween, and in this case, the first cooling water or the second cooling water may be used as a cooling medium or a heat medium on the TMS line.

Further, the fuel cell system may include a first connection line 130 forming the first cooling line 110 and a heating loop (a heating circulation path), a second connection line 150 forming the first cooling line 110 and a heating/cooling loop, and a third connection line 140 forming the first cooling line 110 and a cooling loop to cool the first cooling water. For example, as illustrated in FIG. 2, the first cooling water may be cooled or heated while circulating through the first connection line 130, the second connection line 150, or the third connection line 140.

The first cooling line 110 may form a cooling loop for cooling the first cooling water or a heating loop for heating (increasing a temperature of) the first cooling water according to a state of the vehicle. For example, the first cooling line 110 may form a heating loop for ensuring cold start capability in an initial starting state of the vehicle and form a cooling loop during traveling so that heat generated by the fuel cell stack 10 may be discharged to the outside. The fuel cell stack 10, a first valve 20, a first pump 30, a second valve 40, and a first radiator 60 may be arranged on the first cooling line 110 through which the first cooling water circulates.

The fuel cell stack 10 (or referred to as a "fuel cell") may be formed in a structure capable of producing electricity through an oxidation-reduction reaction of a fuel (for example, hydrogen) and an oxidizing agent (for example, air). As an example, the fuel cell stack 10 may include a membrane electrode assembly (MEA) in which catalytic electrode layers in which electrochemical reactions occur are attached to both sides with respect to a center of an electrolyte membrane through which hydrogen ions move, a gas diffusion layer (GDL) that serves to evenly distribute reactive gases and transfer generated electrical energy, a gasket and a fastening mechanism for maintaining airtightness and appropriate fastening pressure of the reactive gases and the first cooling water, and a bipolar plate that moves the reactive gases and the first cooling water.

In the fuel cell stack 10, the hydrogen as the fuel and the air (oxygen) as the oxidizing agent are supplied to an anode and a cathode of the MEA through a passage of the bipolar plate. The hydrogen may be supplied to the anode and the air may be supplied to the cathode. The hydrogen supplied to the anode is decomposed into hydrogen ions (protons) and electrons by a catalyst of electrode layers configured on both sides of the electrolyte membrane. Among them, only the hydrogen ions may be selectively transferred to the cathode through the electrolyte membrane that is a positive ion exchange membrane, and at the same time, the electrons may be transferred to the cathode through the GDL and the bipolar plate that are conductors. In the cathode, the hydrogen ions supplied through the electrolyte membrane and the electrons transferred through the bipolar plate may react with oxygen in the air supplied to the cathode by an air supply device to produce water. Due to movement of the hydrogen ions occurring in this case, a flow of the electrons through an external conducting wire may occur, and a current may be generated by the flow of the electrons.

The first valve 20 may switch a flow path of the first cooling water on the first cooling line 110 to the first connection line 130 or the fuel cell stack 10 in which a heater 50 is disposed. For example, the first valve 20 may be connected to one end of the first pump 30, one end of the first connection line 130, and one end of the fuel cell stack 10 on the first cooling line 110. The first valve 20 may include various valve devices capable of selectively switching the flow path of the first cooling water. As an example, the first valve 20 may be a three-way valve. In this case, the first valve 20 may include a first port 21 connected to the first cooling line 110 so that the first cooling water pumped by the first pump 30 flows thereinto, a second port 22 connected to the first cooling line 110 so that the first cooling water passing through the first valve 20 flows into the fuel cell stack 10, and a third port 23 connected to one end of the first connection line 130. As the second port 22 and the third port 23 of the first valve 20 are opened or closed, the flow path of the first cooling water may be switched to the heater 50 of the first connection line 130 or the fuel cell stack 10. That is, when the second port 22 is opened and the third port 23 is blocked, the first cooling water flows into the fuel cell stack 10, and in contrast, when the third port 23 is opened and the second port 22 is blocked, the first cooling water may flow into the heater 50 through the first connection line 130.

The first connection line 130 may form the heating loop (a heating circulation path) with the first cooling line 110 to heat the first cooling water. For example, the first cooling water flowing along the first connection line 130 may be heated while passing through the heater 50 installed in the first connection line 130. One end of the first connection line 130 may be connected to the first cooling line 110 at a first point located between an outlet of the first pump 30 and the fuel cell stack 10, and the other end of the first connection line 130 may be connected to the first cooling line 110 at a second point located between an inlet of the first pump 30 and the fuel cell stack 10. Here, the inlet of the first pump 30 may be defined as an inlet through which the first cooling water flows into the first pump 30. Further, the outlet of the first pump 30 may be defined as an output through which the first cooling water passing through the first pump 30 is discharged. Further, a section between the outlet of the first pump 30 and the fuel cell stack 10 may be defined as a section through which the first cooling water discharged from the first pump 30 flows to a first cooling water inlet (not illustrated) of the fuel cell stack 10. Further, a section between the inlet of the first pump 30 and the fuel cell stack 10 may be defined as a section through which the first cooling water discharged from a cooling water outlet (not illustrated) of the fuel cell stack 10 flows to the inlet of the first pump 30.

The first pump 30 may be set such that the first cooling water forcibly flows. The first pump 30 may include various devices capable of pumping the first cooling water, and the type and number of the first pump 30 are not limited to the present disclosure.

The second valve 40 may switch the flow path of the first cooling water on the first cooling line 110 to the first radiator 60 or the fuel cell stack 10. For example, the second valve 40 may be provided on the first cooling line 110 to be located between the first pump 30 and the first radiator 60 and may be connected to one end of the third connection line 140 and one end of the second connection line 150. The second valve 40 may include various valve devices capable of selectively switching the flow path of the first cooling water to the first radiator 60 or the fuel cell stack 10. As an example, the second valve 40 may be a four-way valve. In this case, the second valve 40 may include a first port 41 connected to the third connection line 140, a second port 42 connected to the first cooling line 110 so that the first cooling water passing through the first radiator 60 flows thereinto, a third port 43 connected to the one end of the second connection line 150, and a fourth port 44 connected to the first cooling line 110 so that the first cooling water flows into the first pump 30. As the first port 41 and the second port 42 of the second valve 40 are opened or closed, the flow path of the first cooling water may be switched to the first radiator 60 or the fuel cell stack 10. That is, when the first port 41 is opened and the second port 42 is blocked, the first cooling water flows into the fuel cell stack 10 without passing through the first radiator 60, and in contrast, when the second port 42 is opened and the first port 41 is blocked, the first cooling water may flow into the fuel cell stack 10 after passing through the first radiator 60.

The second connection line 150 may form a cooling/heating loop with the first cooling line 110 to cool or heat an air conditioning device 90. As an example, the second connection line 150 may form a loop that heats a heater (not illustrated) of the air conditioning device 90. One end of the second connection line 150 may be connected to the first cooling line 110 between a first point (a point at which one end of the first connection line 130 is connected to the first cooling line 110) and an inlet of the fuel cell stack 10, and a portion of the first cooling water may circulate through the second connection line 150. The other end of the second connection line 150 may be connected to the first cooling line 110 between the first pump 30 and a second point (a point at which the other end of the first connection line 130 is connected to the first cooling line 110).

The second connection line 150 may be provided with an ion filter 95 that filters ions of the first cooling water passing through the air conditioning device 90. When electrical conductivity of the first cooling water increases due to corrosion or exudation of a system, electricity flows to the first cooling water to cause a short circuit of the fuel cell stack 10 or cause a current to flow toward the first cooling water, and thus the first cooling water should maintain low electrical conductivity. The ion filter 95 may be set to remove the ions included in the first cooling water so that the electrical conductivity of the first cooling water may be maintained at a predetermined level or less. In this way, during cold starting during which the supply of the first cooling water flowing to the fuel cell stack 10 is blocked (the second port 22 of the first valve 20 is blocked), the first cooling water circulates (passes through a temperature increasing loop) via the heater 50 of the first connection line 130, and at the same time, circulates along the second connection line 150. Accordingly, even in the cold starting, the filtering by the ion filter 95 provided in the second connection line 150 may be performed (the ions included in the first cooling water is removed). Thus, the electrical conductivity of the first cooling water flowing into the fuel cell stack 10 immediately after the cold starting may be maintained at a certain level or less.

The third connection line 140 may form a cooling loop with the first cooling line 110 to cool the first cooling water. As an example, one end of the third connection line 140 may be connected to the first cooling line 110 between the first pump and the first radiator 60, and the other end of the third connection line 140 may be connected to the first cooling line 110 between the cooling water outlet of the fuel cell stack 10 and the first radiator 60.

The first radiator 60 may be set to cool the first cooling water. The first radiator 60 may be formed in various structures capable of cooling the first cooling water, and the present disclosure is not restricted or limited by the type and structure of the first radiator 60. The first radiator 60 may be connected to a first reservoir 62 in which the first cooling water is stored.

The fuel cell system may include a first temperature sensor 112 that measures the temperature of the first cooling water between the fuel cell stack 10 and the first point (the first valve 20), a second temperature sensor 114 that measures the temperature of the first cooling water between the other end of the first connection line 130 and the first pump 30, and a third temperature sensor 116 that measures the temperature of the first cooling water in the heater 50. The fuel cell system may control an inflow rate of the first cooling water flowing into the fuel cell stack 10 on the basis of the temperatures measured by the first temperature sensor 112, the second temperature sensor 114, and the third temperature sensor 116. As an example, when the measured temperature of the first cooling water circulating along the first cooling line 110 is lower than a predetermined target temperature, the inflow rate of the first cooling water may be controlled to become lower than a preset inflow rate. In this way, when the measured temperature of the first cooling water is low, the inflow rate of the first cooling water flowing into the fuel cell stack 10 is controlled to be low, and thus thermal shock and performance degradation due to a difference between the temperature of the first cooling water staying inside the fuel cell stack 10 and the temperature of the first cooling water flowing into the fuel cell stack 10 may be minimized.

The second cooling line 120 may pass through the power electronic parts 200, and the second cooling water may circulate along the second cooling line 120. Here, the power electronic parts 200 of the vehicle may be understood as a component using power of the vehicle as an energy source, and the present disclosure is not restricted or limited by the type and number of the power electronic parts 200 of the vehicle. For example, the power electronic parts 200 may include at least one of a second pump 205 for pumping the second cooling water, a bi-directional high voltage DC-DC converter (BHDC) 210 provided between the fuel cell stack 10 and a high-voltage battery (not illustrated) of the vehicle, a blower pump control unit (BPCU) 220 that controls a blower (not illustrated) for supplying outside air for driving the fuel cell stack 10, a low-voltage DC-DC converter (LDC) 230 that converts DC high voltage supplied from the high-voltage battery into DC low voltage, an air compressor (ACP) 240 for compressing air supplied to the fuel cell stack 10, and an air cooler 250.

The second pump 205 (not illustrated) for allowing second cooling water to forcibly flow may be disposed on the second cooling line 120. The second pump 205 may include a pumping device capable of pumping the second cooling water, and the type and number are not limited to the present disclosure.

A second radiator 70 for cooling the second cooling water may be disposed on the second cooling line 120. The second radiator 70 may be formed in various structures capable of cooling the second cooling water, and the type and structure of the second radiator 70 is not restricted or limited. The second radiator 70 may be connected to a second reservoir 72 in which the second cooling water is stored.

In an embodiment, the first radiator 60 and the second radiator 70 may be simultaneously cooled by one cooling fan 80. As an example, the first radiator 60 and the second radiator 70 may be arranged side by side, and the cooling fan 80 may be set to blow outside air to the first radiator 60 and the second radiator 70. As the first radiator 60 and the second radiator 70 are simultaneously cooled by the one cooling fan 80, the structure of the fuel cell system may be simplified, a degree of freedom of design and space utilization may be improved, and power consumption for cooling the first radiator 60 and the second radiator 70 may be minimized.

The heat exchanger 300 may be set to exchange the heat between the first cooling water and the second cooling water. Since the temperature of the second cooling water for cooling the power electronic part is relatively lower than the temperature of the first cooling water for cooling the fuel cell stack 10, the fuel cell system may lower the temperature of the first cooling water without increasing the capacities of the first radiator 60 and the cooling fan 80 by exchanging the heat between the first cooling water and the second cooling water, cooling efficiency of the fuel cell stack 10 may be improved, and safety and reliability may be improved. Further, since the fuel cell system may lower the temperature of the first cooling water while a vehicle (for example, a construction machinery) is stopped in which a driving wind cannot be used, high-output operation of the fuel cell stack 10 may be secured, and safety and durability may be improved.

In an embodiment, the heat exchanger 300 may be connected to the first cooling line 110 between the outlet of the first radiator 60 and the fuel cell stack 10, and the second cooling line 120 may connect the outlet of the second radiator 70 and the power electronic part to pass through the heat exchanger 300. For example, the first cooling water may flow along the heat exchanger 300 connected to the first cooling line 110, and the second cooling line 120 may pass through an inside of the heat exchanger 300 so that the second cooling line 120 is exposed to the first cooling water (for example, the first cooling water flows along a circumference of the second cooling line 120). In this way, the temperature of the first cooling water flowing into the fuel cell stack 10 by exchanging the heat between the first cooling water and the second cooling water may be lowered. A first temperature of the first cooling water passing through the first radiator 60 may be formed to be higher than a second temperature of the second cooling water passing through the second radiator 70, and a third temperature of the first cooling water passing through the heat exchanger 300 may be formed to be lower than the first temperature. As an example, the first temperature of the first cooling water may be formed to be higher than the second temperature of the second cooling water by 10° C., and the third temperature of the first cooling water passing through the heat exchanger 300 (exchanging heat with the second cooling water) may be formed to be lower than the first temperature by 1° C.

Figure 3:
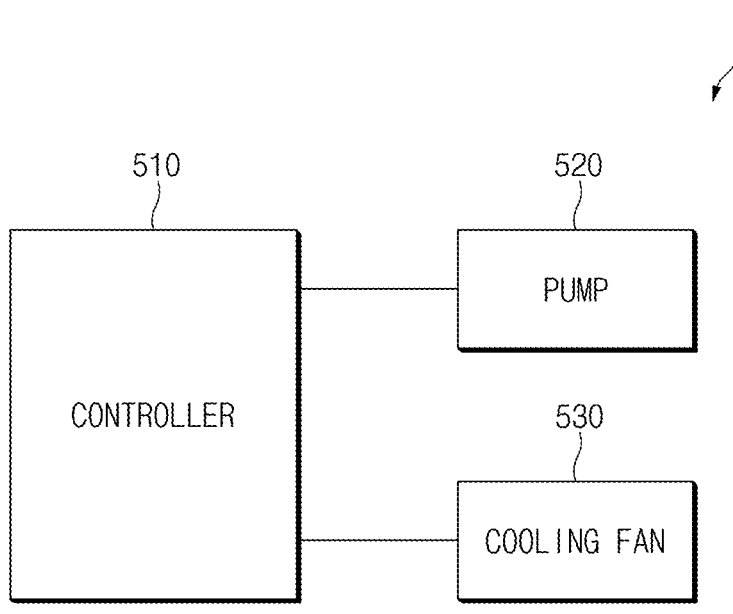
FIG. 3 is a block diagram illustrating a fuel cell system according to an embodiment of the present disclosure.

FIG. 3 is a block diagram illustrating a fuel cell system according to an embodiment of the present disclosure.

Referring to FIG. 3, a fuel cell system 1 may include a controller 510, a pump 520, and a cooling fan 530. In the fuel cell system 1, the controller 510 controls the number of rotations of the pump 520 and the cooling fan 530 to effectively perform cooling in response to heat generated by a configuration of the fuel cell system 1 as well as a wire. In this case, the fuel cell system 1 may manage heat of the wire by using the TMS, and thus is economical because a separate configuration is not required. Further, the fuel cell system 1 may increase efficiency of power transmission to an electronic part through effective heat management and prevent degradation due to a high temperature.

According to the embodiment, the fuel cell system 1 may include a cooling line in which cooling water passing through a plurality of electronic parts circulates and the wire for supplying power to the plurality of electronic parts. For example, the cooling line may correspond to the second cooling line 120 illustrated in the FIGS. 1 and 2.

According to the embodiment, the plurality of electronic parts may include at least one of the BHDC, the BPCU, and a DC-DC converter. In this case, the DC-DC converter may include a buck/boost converter. The types of the electronic parts are merely illustrative, and the electronic parts may further include various devices connected to or included in the fuel cell system 1.

According to the embodiment, the fuel cell system 1 may include the pump 520 connected to the cooling line to pump the cooling water and the cooling fan 530 that cools the cooling water. In this case, the pump 520 and the cooling fan 530 may correspond to, for example, the second pump 205 and the cooling fan 80 illustrated in FIGS. 1 and 2, respectively.

According to the embodiment, the fuel cell system 1 may include the controller 510 that determines a control mode on the basis of the temperature of the wire, and controls the number of rotations of the pump 520 and the cooling fan 530 on the basis of the control mode. The controller 510 may differently control the number of rotations of the pump 520 and the cooling fan 530 according to the control mode.

According to the embodiment, the controller 510 may be a hardware device such as a processor, a micro processor unit (MPU), a micro controller unit (MCU), a central processing unit (CPU), and an electronic controller unit (ECU) or a program implemented by the processor. The controller 510 may be connected to respective components of the fuel cell system 1 to perform overall functions related to management and operation of the fuel cell stack. As an example, the controller 510 may be a fuel cell control unit (FCU) that controls the overall functions of the fuel cell system.

According to the embodiment, the controller 510 may communicate with the respective components, for example, the pump 520, the cooling fan 530, and the like, constituting the fuel cell system 1 by wire or wirelessly, and may perform the communication on the basis of, for example, controller area network (CAN) communication.

According to the embodiment, the control mode may include a normal mode and a correction mode. In this case, the normal mode may include a control mode in which a state of the fuel cell and states of the plurality of electronic parts are considered without considering a state (for example, a heat amount, a current, and the like) of the wire. Further, the correction mode may mean a control mode in which a state of the wire together with the state of the fuel cell and the states of the plurality of electronic parts are considered.

According to the embodiment, the controller 510 may generate a control signal indicating the control mode and transmit the control signal to components, for example, the pump 520, and the cooling fan 530, and the like, of the fuel cell system 1 to perform control according to the control mode. As an example, the control signal may have a value of 0 or 1, and the controller 510 may transmit a control signal having a value of 0 to perform control in the normal mode and transmit a control signal having a value of 1 to perform control in the correction mode.

According to the embodiment, the controller 510 may determine the control mode as the correction mode when at least one of a first condition and a second condition based on the temperature of the wire is satisfied.

The first condition may include a case in which a proportional degree between an output current of the DC-DC converter included in the plurality of electronic parts and the temperature of the wire is greater than or equal to a threshold value and the temperature of the wire is greater than or equal to a temperature of the DC-DC converter. For example, the threshold value may be determined on the basis of a cooling requirement amount, an amount of heat generated by the wire, an output amount of the DC-DC converter, a temperature and flow rate of the cooling water, a limited performance of a vehicle or non-vehicle equipped with the fuel cell system.

The proportional degree between the output current of the DC-DC converter and the temperature of the wire may indicate a value obtained by comparing an increase in the output current of the DC-DC converter and an increase in the temperature of the wire. For example, the proportional degree between the output current of the DC-DC converter and the temperature of the wire may be expressed as in [Equation 1]

$$\text{Proportional degree} = \frac{\text{Increase in temperature of wire}}{\text{Increase in output current of DC-DC converter}} \qquad \text{[Equation 1]}$$

According to the embodiment, when the proportional degree between the output current of the DC-DC converter and the temperature of the wire is greater than or equal to the threshold value, this may mean that the temperature of the wire increases faster than the increase in the output of the DC-DC converter. Thus, since the amount of heat generated in the wire also increases rapidly, the number of rotations of the pump 520 and/or the cooling fan 530 rather than the control in the normal mode to respond to this rapid increase, thereby improving cooling effect. That is, the controller 510 may determine the control mode as the correction mode in which the heat of the wire is considered, thereby effectively cooling the wire. In contrast, when the proportional degree between the output current of the DC-DC converter and the temperature of the wire is less than the threshold value, since this means that the increase in the temperature of the wire is small compared to the increase in the output of the DC-DC converter, it may be determined that additional cooling through the increase in the number of rotations of the pump 520 and/or the cooling fan 530 is not essential, and the controller 510 may determine the control mode as the normal mode.

Further, even when the proportional degree between the output current of the DC-DC converter and the temperature of the wire is greater than or equal to the threshold value, when the temperature of the wire is less than the temperature of the DC-DC converter, the controller 510 may determine that the wire is sufficiently cooled in a current control state (for example, control in the normal mode), and thus determine the control mode as the normal mode. In this case, the controller 510 may determine whether to correct the number of rotations of the pump 520 and the cooling fan 530 and thus reduce power consumption.

The second condition may include a case in which the temperature of the wire is greater than the temperature of the cooling water. In this case, the temperature of the cooling water may increase due to the heat of the wire or the like, and the controller 510 may determine the control mode as the correction mode and correct and control the number of rotations of the cooling fan 530, thereby reducing the temperature of the cooling water and improving a cooling effect.

According to the embodiment, when the first condition is satisfied, the controller 510 may correct the number of rotations of the pump 520 by reflecting a pump correction value based on the temperature of the wire to a preset first pump rotation number in the correction mode. Here, the first condition may be a condition for the controller 510 to determine whether to correct the number of rotations of the pump 520.

According to the embodiment, the first pump rotation number may be a value determined according to the states of the plurality of electronic parts and the cooling water in the normal mode. That is, the first pump rotation number may mean the number of rotations determined in the normal mode in which the state of the wire is not considered. This may be understood for the purpose of performing correction according to the state of the wire on the basis of a case in which the states of the components except for the state of the wire are the same.

In this case, the states of the plurality of electronic parts may include the outputs, the currents, the voltages, the temperatures, or the like of the BHDC, the BPCU, and the DC-DC converter included in the plurality of electronic parts, and the state of the cooling water may include the temperature of the cooling water, the flow rate of the cooling water, or the like.

According to the embodiment, the pump correction value may be determined by adding a value based on a difference between the temperature of the wire and a first reference temperature to a pump correction value at a previous time point. In this case, the pump correction value and the first pump rotation number may be calculated by the controller 510.

According to the embodiment, the first reference temperature may be determined on the basis of the output of the fuel cell stack, the output of the DC-DC converter, and the output of the BHDC. The first reference temperature may include a target temperature of the wire through control of the pump 520 and/or the cooling fan 530. The first reference temperature may be calculated by the controller 510.

According to the embodiment, the pump correction value may be calculated by [Equation 2].

$$A_{control}(k+1)=A_{control}(k)+0.1(A_{reference}(k)-A_{real}(k)) \qquad \text{[Equation 2]}$$

Here, $A_{control}(k)$ means a pump correction value at a $k^{th}$ control time point, $A_{reference}(k)$ means a first reference temperature at the $k^{th}$ control time point, and $A_{real}(k)$ means a temperature of a wire at the $k^{th}$ control time point. In this way, the controller 510 may determine the correction value at a next control time point by reflecting a difference between the first reference temperature and the temperature of the wire in the pump correction value at a current control time point. For example, the control time point may be determined at equal intervals. Further, here, 0.1 is a gain, is merely illustrative, and may be set to another value.

According to the embodiment, the first reference temperature may be calculated by [Equation 3].

$$A_{reference}(k)=T_{ambient}-|\{B_{real}(k)*\alpha+d/dt(C_{real}(k))*\beta+ \\ D_{real}(k)*\gamma\}| \qquad \text{[Equation 3]}$$

Here, $A_{reference}(k)$ may mean the first reference temperature at the $k^{th}$ control time point, $T_{ambient}$ may mean an internal temperature of the DC-DC converter, $B_{real}(k)$ may mean output of the fuel cell at the $k^{th}$ control time point, $C_{real}(k)$ may mean output of the DC-DC converter at the $k^{th}$ control time point, and $D_{real}(k)$ may mean output of the BHDC at the $k^{th}$ control time point. Further, $\alpha$, $\beta$, and $\gamma$ may indicate variable factors for reflecting the output of the fuel cell, the output of the DC-DC converter, and the output of the BHDC.

In [Equation 2] and [Equation 3], for example, an initial value of the pump correction value may be set to $A_{control}(0)=0$, and each variable factor may be set to be calibrated in a range of $\alpha=0\sim0.1$, $\beta=0\sim0.01\gamma=0\sim0.1$.

According to the embodiment, the controller 510 may correct the number of rotations of the pump by adding the pump correction value to the first pump rotation number. In this case, the pump correction value is a positive number and may be determined to be less than or equal to a preset ratio of the first pump rotation number. For example, pump correction value may be determined to meet [pump correction value/first pump rotation number≤preset ratio]. The controller 510 may calibrate the values of $\alpha$, $\beta$, and $\gamma$ within a predetermined range so that the pump correction value may be calculated within such a range. When the pump correction value exceeds a certain level, a rapid change in the number of rotations of the pump 520 may occur. Accordingly, since a current state does not match the control in the normal mode, the controller 510 may limit the pump correction value to a value less than or equal to a preset ratio of the first pump rotation number, which is a reference for correction. The preset ratio may be set to, for example, 0.1.

According to the embodiment, when the second condition is satisfied, the controller 510 may correct the number of rotations of the cooling fan by reflecting a cooling fan correction value based on the temperature of the cooling water to a preset first cooling fan rotation number in the correction mode. Here, the second condition may be a condition for determining whether to correct the number of rotations of the cooling fan.

According to the embodiment, the first cooling fan rotation number may be a value determined according to the states of the plurality of electronic parts and the cooling water in the normal mode. That is, the first cooling fan rotation number may mean the number of rotations according to control when the state of the wire is not considered. This may be understood for the purpose of performing correction according to the state of the wire on the basis of a case in which the states of the components except for the state of the wire are the same.

In this case, the states of the plurality of electronic parts may include the outputs, the currents, the voltages, the temperatures, or the like of the BHDC, the BPCU, and the DC-DC converter included in the plurality of electronic parts, and the state of the cooling water may include the temperature of the cooling water, the flow rate of the cooling water, or the like.

According to the embodiment, the cooling fan correction value may be determined by adding a value based on a difference between the temperature of the cooling water and a second reference temperature to the cooling fan correction value at a previous time point. In this case, the cooling fan correction value and the first cooling fan rotation number may be calculated by the controller 510.

According to the embodiment, the second reference temperature may be determined on the basis of the temperature of the wire and the output of the DC-DC converter. The second reference temperature may include a target temperature of the cooling water through control of the pump 520 and/or the cooling fan 530. The second reference temperature may be calculated by the controller 510.

According to the embodiment, the cooling fan correction value may be calculated by [Equation 4].

$$E_{control}(k+1)=E_{control}(k)+0.5(E_{reference}(k)-E_{real}(k)) \qquad \text{[Equation 4]}$$

Here, $E_{control}(k)$ means the pump correction value at the $k^{th}$ control time point, $E_{reference}(k)$ means the second reference temperature at the $k^{th}$ control time point, and $E_{real}(k)$ means the temperature of the cooling water at the $k^{th}$ control time point. In this way, the controller 510 may determine the correction value at a next control time point by reflecting a difference between the second reference temperature and the temperature of the cooling water at a current control time point. For example, the control time point may be determined at equal intervals. Further, here, 0.5 is a gain, is merely illustrative, and may be set to another value. In this case, since the increase in the temperature of the cooling water means that heating of the wire and the electronic parts is continuous or large, the gain is set to 0.5 or the like, and thus a rapid responsiveness may be provided.

According to the embodiment, the second reference temperature may be calculated by [Equation 5].

$$E_{reference}(k)=A_{real}(k)-10/d/dt(C_{real}(k)) \qquad \text{[Equation 5]}$$

Here, $E_{reference}(k)$ may mean the second reference temperature at the $k^{th}$ control time point, $A_{real}(k)$ may mean the temperature of the wire at the $k^{th}$ control time point, and $C_{real}(k)$ may mean output of the DC-DC converter at the $k^{th}$ control time point. Here, it may be understood that the second reference temperature corresponding to the target temperature of the cooling water is set to be smaller than the temperature of the wire by 10 degrees. That is, 10 is a merely illustrative, and may be set to another value.

Further, when the output of the DC-DC converter is rapidly changed ($d/dt(C_{real}((k))$ is large), when this rapid change is immediately reflected, the number of rotations of the cooling fan 530 is rapidly changed, and thus it is difficult to maintain the temperature of the cooling water constant. Thus, as a value obtained by dividing a change in the output of the DC-DC converter is set as a value, the temperature of the cooling water may be maintained constant. To this end, according to the embodiment, the controller 510 may correct the number of rotations of the cooling fan 530 in a range of $1 \leq d/dt(C_{real}(k)) \leq 10$. For example, the controller 510 may apply ten when a value of $d/dt(C_{real}(k))$ is greater than ten and apply one when the value of $d/dt(C_{real}(k))$ is smaller than 1.

According to the embodiment, the controller 510 may correct the number of rotations of the cooling fan by adding the cooling fan correction value to the first cooling fan rotation number. In this case, the cooling fan correction value is a positive number and may be determined to be less than or equal to a preset ratio of the first cooling fan rotation number. When the cooling fan correction value exceeds a certain level, a rapid change in the number of rotations of the cooling fan 530 may occur. Accordingly, since a current state does not match the control in the normal mode, the controller 510 may limit the cooling fan correction value to a value less than or equal to a preset ratio of the first cooling fan rotation number, which is a reference for correction. The preset ratio may be set to, for example, 0.1. In the cooling fan correction and the pump correction, the preset ratio may be set equally but may be also set differently.

Figure 4:
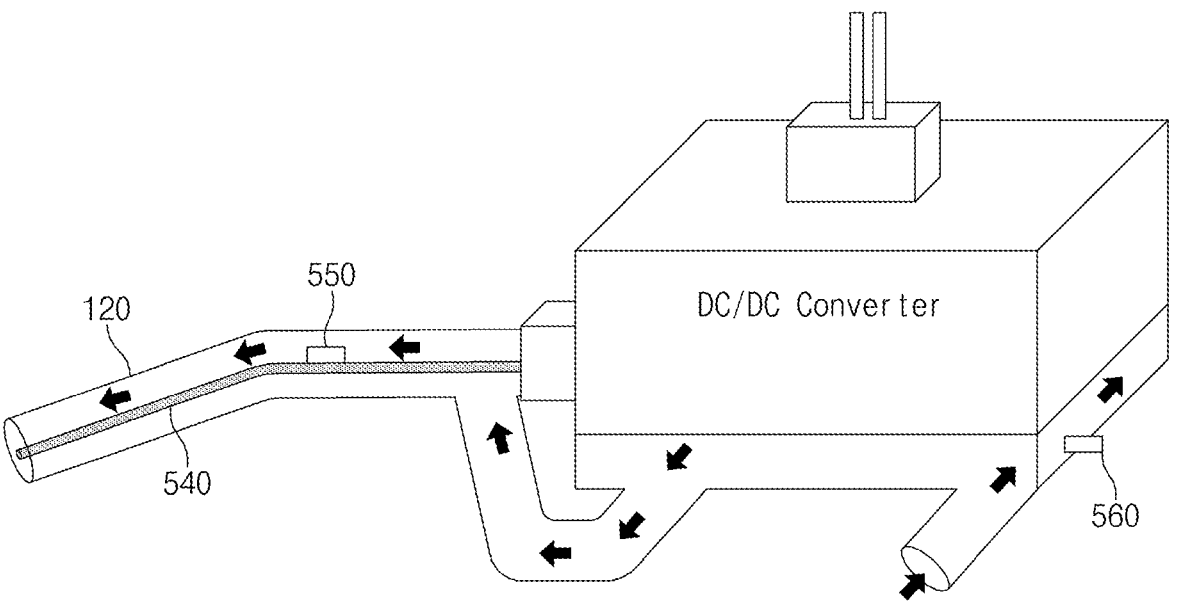
FIG. 4 is a view illustrating a structure for cooling a wire according to the embodiment of the present disclosure.

FIG. 4 is a view illustrating a structure for cooling a wire according to the embodiment of the present disclosure.

Referring to FIG. 4, the wire of the fuel cell system 1 may be disposed inside the cooling line 120 for the purpose of cooling. In this way, the fuel cell system 1 may cool the wire through flow of the cooling water of the TMS.

According to the embodiment, a wire 540 may be connected to an output terminal of the DC-DC converter. Since power conversion is performed in the DC-DC converter to satisfy a voltage specification of a load terminal, a lot of heat is generated in the wire 540 at a point connected to the output terminal of the DC-DC converter. Thus, in the fuel cell system 1, the wire 540 to which the output terminal of the DC-DC converter is connected is disposed inside the cooling line 120, so that the wire 540 may be cooled through flow of the cooling water.

According to the embodiment, the wire 540 may include a housing (not illustrated) for blocking direct contact with the cooling water. The wire 540 may be disposed inside the cooling line 120, and since a current flows in the wire 540 and the cooling water circulates in the cooling line 120, the housing for insulation may be provided. The housing may surround the outside of a conductive wire constituting the wire 540.

According to the embodiment, the fuel cell system 1 may include a wire temperature sensor 550 that acquires the temperature of the wire and a cooling water temperature sensor 560 that acquires the temperature of the cooling water. For example, the wire temperature sensor 550 may be positioned inside the housing of the wire 540 to quickly and accurately cope with the heating of the wire. The cooling water temperature sensor 560 may be positioned at an inlet point through which the cooling water passes through the DC-DC converter.

Figure 5:
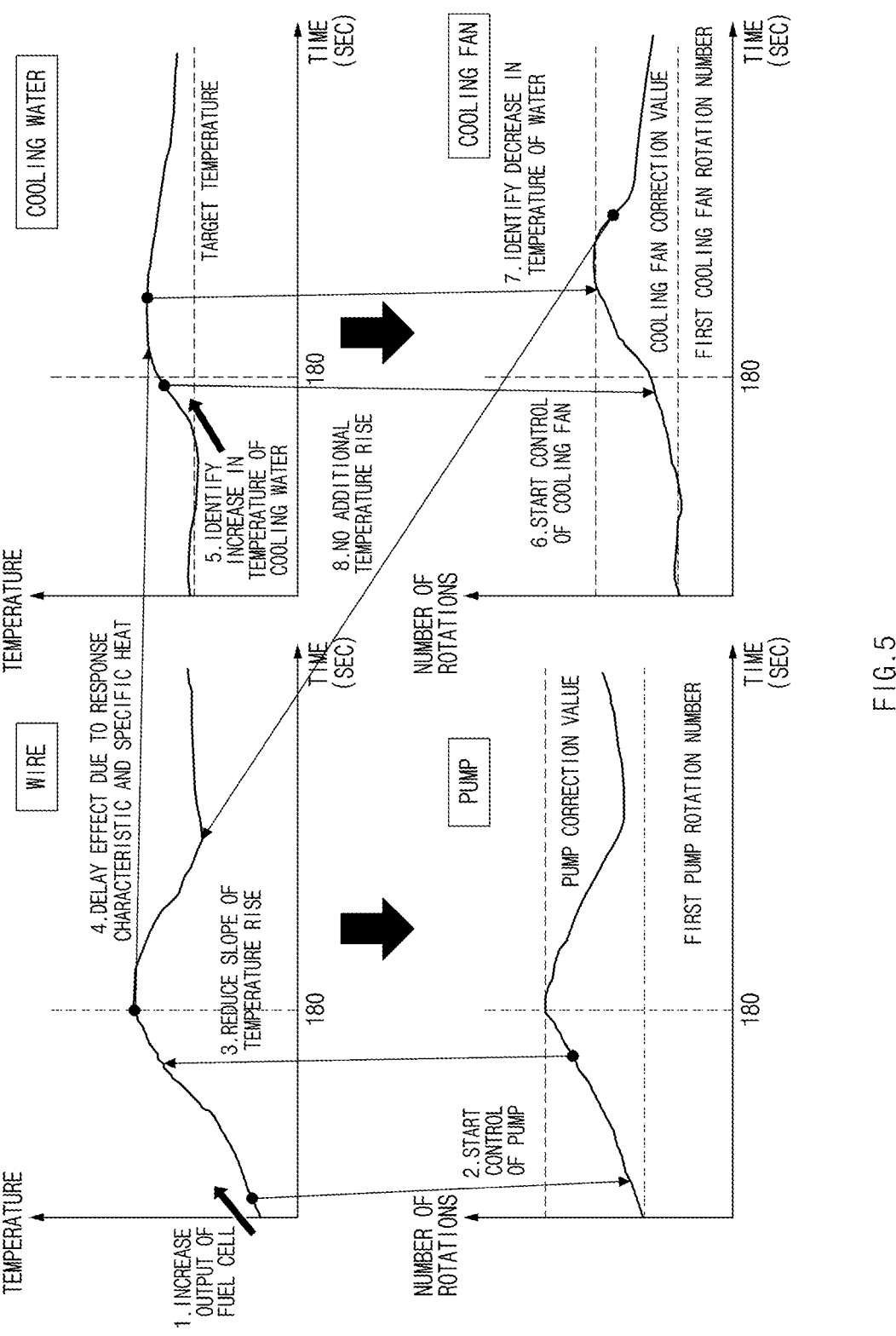
FIG. 5 is a view illustrating a control relationship of the fuel cell system according to the embodiment of the present disclosure.

FIG. 5 is a view illustrating a control relationship of the fuel cell system according to the embodiment of the present disclosure.

Referring to FIG. 5, a control relationship between the pump 520 and the cooling fan 530 according to the temperatures of the wire and the cooling water may be identified. In FIG. 5, description will be made on the assumption that the control mode of the fuel cell system 1 is the control mode in the correction mode.

Referring to an upper left graph of FIG. 5, the controller 510 may detect an increase in the temperature of the wire due to an increase in the output according to the operation of the fuel cell system 1. When an increase in the temperature of the wire is large, for example, when the above-described first condition is satisfied, the controller 510 may correct and control the number of rotations of the pump 520. In this case, the controller 510 may determine the number of rotations of the pump 520 by adding the pump correction value to the first pump rotation number. An example in which the controller 510 corrects and controls the number of rotations of the pump 520 may be identified through a lower left graph of FIG. 5. The controller 510 may increase the flow rate of the cooling water passing through the wire through the control, thereby reducing the increase in the temperature of the wire and further lowering the temperature of the wire.

Referring to an upper right graph of FIG. 5, it may be identified that the temperature of the cooling water also increases due to the heating of the wire. In this case, due to a specific heat, a response characteristic or the like of the cooling water, a time point at which the temperature of the cooling water starts to be increased may be delayed compared to a time point at which the temperature of the wire starts to be increased. The controller 510 may detect an increase in the temperature of the cooling water and may correct and control the number of rotations of the cooling fan 530 when it is determined that the temperature of the cooling water increases. For example, the controller 510 may correct the number of rotations of the cooling fan 530 when the above-described second condition is satisfied. In this case, the controller 510 may determine the number of rotations of the cooling fan 530 by adding a cooling fan rotation value to the first cooling fan rotation number. An example in which the controller 510 corrects and controls the number of rotations of the cooling fan 530 may be identified through a lower right graph of FIG. 5. The controller 510 may control the temperature of the cooling water to reach a target temperature by lowering the temperature of the cooling water through the control.

The controller 510 may cool the wire 540 through the control of the pump 520 and the cooling fan 530 so that the temperature of the wire 540 is maintained at a certain temperature. That is, according to the embodiment, the controller 510 may primarily increase the cooling effect by increasing the flow rate of the cooling water through correcting the number of rotations of the pump 520 and to cool the wire 540 and may then maintain the cooling effect by coping with the increase in the temperature of the cooling water according to the increase in the temperature of the wire through the increase in the number of rotations of the cooling fan 530. For example, in the first condition and the second condition, the first condition may be a condition for controlling the flow rate of the cooling water through the control of the pump 520, and the second condition is a condition for controlling the temperature of the cooling water through the control of the cooling fan 530.

Figure 6:
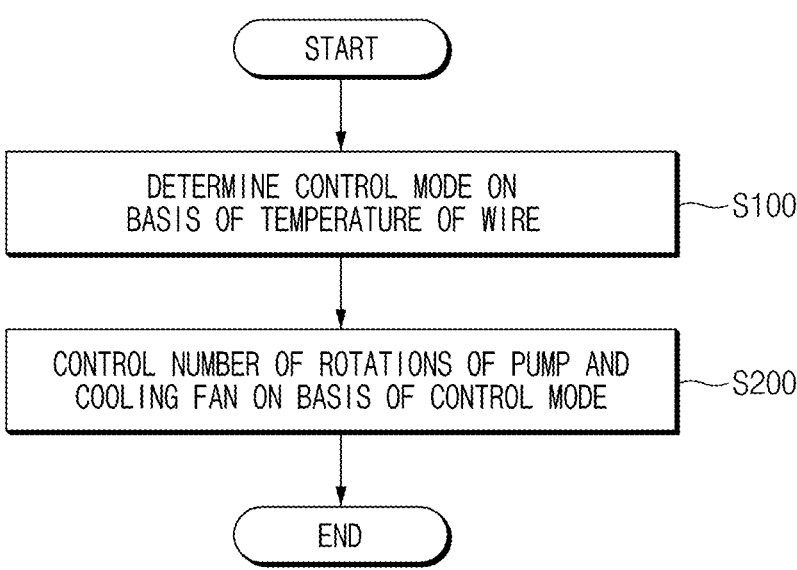
FIG. 6 is a flowchart for describing a method of controlling the fuel cell system according to the embodiment of the present disclosure.

FIG. 6 is a flowchart for describing a method of controlling the fuel cell system according to the embodiment of the present disclosure.

Referring to FIG. 6, a method for controlling the fuel cell system may include operation S100 of determining the control mode on the basis of the temperature of the wire and operation S200 of controlling the number of rotations of the pump and the cooling fan on the basis of the control mode.

In operation S100, the controller 510 may determine the control mode on the basis of the temperature of the wire. A detailed method of determining the control mode by the controller 510 will be described below with reference to FIG. 7.

In operation S200, the controller 510 may control the number of rotations of the pump 520 and the cooling fan 530 on the basis of the control mode. According to the embodiment, the control mode may include the normal mode and the correction mode, and the controller 510 may control the number of rotations of the pump 520 and the cooling fan 530 differently according to the normal mode and the correction mode.

Figure 7:
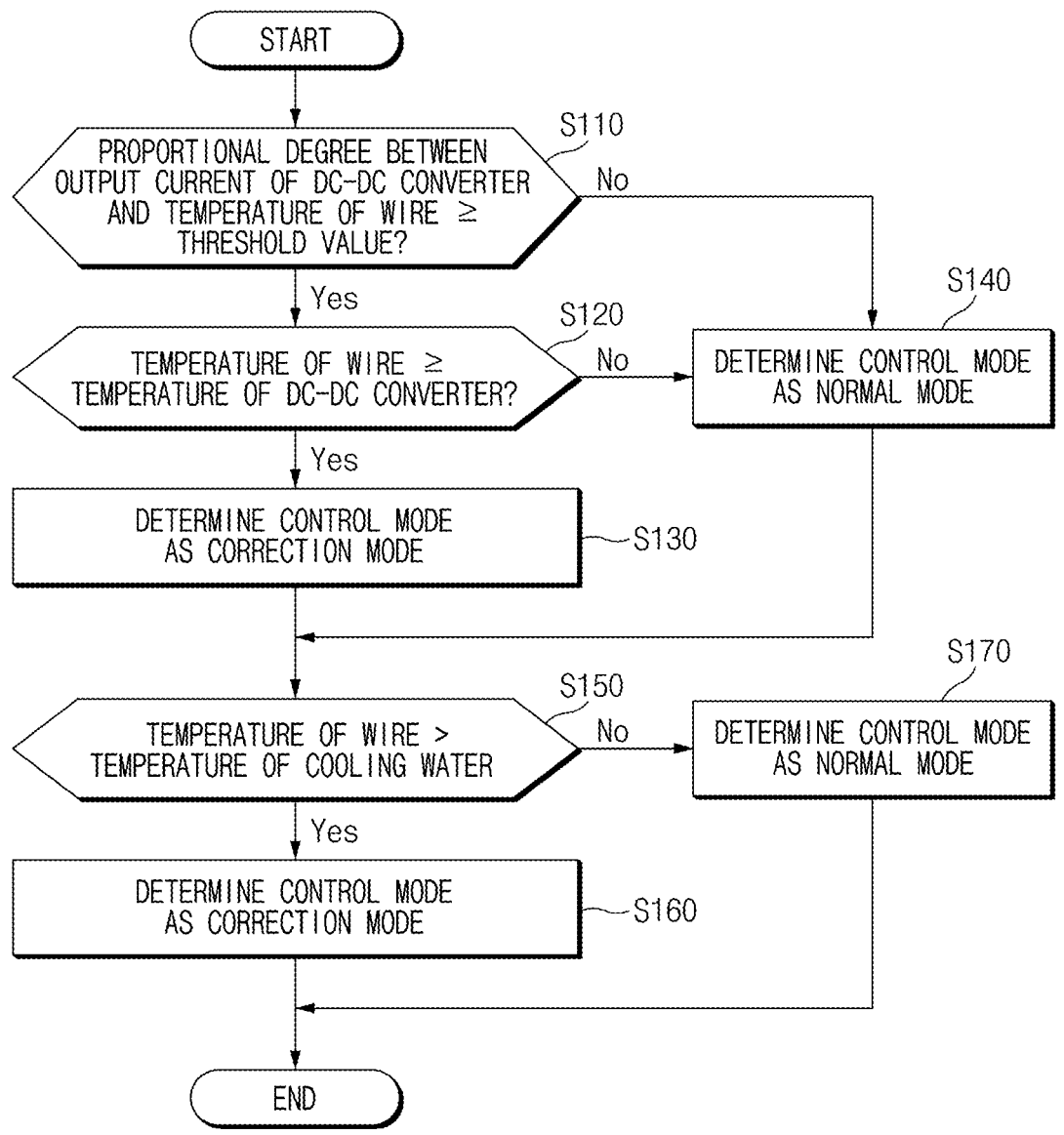
FIG. 7 is a flowchart for describing a method of determining a control mode of the fuel cell system according to the embodiment of the present disclosure.

FIG. 7 is a flowchart for describing a method of determining a control mode of the fuel cell system according to the embodiment of the present disclosure.

Referring to FIG. 7, the controller 510 may determine the control mode on the basis of the temperature of the wire.

In operation S110, the controller 510 may determine the proportional degree between the output current of the DC-DC converter and the temperature of the wire. The controller 510 may proceed to operation S120 when the proportional degree between the output current of the DC-DC converter and the temperature of the wire is greater than or equal to the threshold value (Yes in S110). The controller 510 may proceed to operation S140 when the proportional degree between the output current of the DC-DC converter and the temperature of the wire is less than the threshold value (No in S110).

In operation S120, the controller 510 may compare the temperature of the wire and the temperature of the DC-DC converter. The controller 510 may proceed to operation S130 when the temperature of the wire is greater than the temperature of the DC-DC converter. The controller 510 may proceed to operation S140 when the temperature of the wire is less than or equal to the temperature of the DC-DC converter.

In operation S130, the controller 510 may determine the control mode as the correction mode when the proportional degree between the output current of the DC-DC converter and the temperature of the wire is greater than or equal to the threshold value and the temperature of the wire is greater than the temperature of the DC-DC converter.

In operation S140, the controller 510 may determine the control mode as the normal mode when the proportional degree between the output current of the DC-DC converter and the temperature of the wire is less than the threshold value and the temperature of the wire is less than or equal to the temperature of the DC-DC converter.

In operation S150, the controller 510 may compare the temperature of the wire and the temperature of the cooling water. The controller 510 may proceed to operation S160 when the temperature of the wire is greater than the temperature of the cooling water (Yes in S150). The controller 510 may proceed to operation S170 when the temperature of the wire is less than or equal to the temperature of the cooling water (No in S150).

In operation S160, the controller 510 may determine the control mode as the correction mode when the temperature of the wire is greater than the temperature of the cooling water.

In operation S170, the controller 510 may determine the control mode as the normal mode when the temperature of the wire is less than or equal to the temperature of the cooling water.

In FIG. 7, operation S150 to operation S170 are illustrated as being performed after operation S110 to operation S140, but these are merely an example, and the respective operations may be performed simultaneously.

A fuel cell system according to embodiments disclosed herein is economical because heat of a wire may be managed using a thermal management system (TMS) of a fuel and thus a separate component is not required.

Further, the fuel cell system according to the embodiments disclosed herein may increase the efficiency of transmission of power to an electronic part through thermal management in consideration of the heat of the wire.

Further, the fuel cell system according to the embodiments disclosed herein may effectively cool a component including the wire and thus prevent performance degradation due to high temperature.

In addition, various effects directly or indirectly identified though the present specification may be provided.

Hereinabove, even though it has been described that all components constituting the embodiments disclosed herein are combined into one part or are operated while combined with each other, the embodiments disclosed herein are not necessarily limited to these embodiments. That is, all the components may be operated while selectively combined into one or more parts within the scope of the embodiments disclosed herein.

Further, terms such as "includes", "constitutes", or "have" described above mean that the corresponding component may be inherent unless otherwise stated, and thus should be construed as not excluding other components but further including other components. All terms including technical or scientific terms have the same meanings as those commonly understood by those skilled in the art to which the embodiments disclosed herein pertain unless otherwise defined. The generally used terms defined in the dictionaries should be construed as having the meanings that coincide with the meanings of the contexts of the related technologies, and should not be construed as ideal or excessively formal meanings unless clearly defined in the present disclosure.

The above description is merely illustrative of the technical spirit disclosed herein, and those skilled in the art to which the embodiments disclosed herein belong may make various modifications and changes without departing from the essential features of the embodiments disclosed herein. Thus, the embodiments disclosed herein are not intended to limit the technology spirit of the embodiments disclosed herein but are intended to describe the embodiments disclosed herein, and the scope of the technical spirit disclosed herein is not limited by these embodiments. The scope of protection of the technical spirit disclosed herein should be interpreted with reference to the appended claims, and all technical spirits within the scope equivalent thereto should be interpreted as being included in the scope of the present disclosure.

What is claimed is:

1. A fuel cell system comprising:
a cooling line through which cooling water passing through a plurality of electronic parts circulates, wherein a wire for supplying power to the plurality of electronic parts is disposed inside the cooling line;
a pump connected to the cooling line and configured to pump the cooling water;
a cooling fan configured to cool the cooling water; and
a controller configured to determine a control mode based on a temperature of the wire and to control the number of rotations of the pump and the number of rotations of the cooling fan based on the control mode.

2. The fuel cell system of claim 1, wherein the control mode includes a normal mode and a correction mode,
the controller determines the control mode as the correction mode when at least one of a first condition or a second condition based on the temperature of the wire is satisfied,
the first condition includes a case in which a proportional degree, which is a ratio of an increase in the temperature of the wire to an increase of an output current of a direct current (DC)-DC converter included in the plurality of electronic parts, is greater than or equal to a threshold value and the temperature of the wire is greater than or equal to a temperature of the DC-DC converter, and
the second condition includes a case in which the temperature of the wire is greater than a temperature of the cooling water.

3. The fuel cell system of claim 2, wherein the controller corrects the number of rotations of the pump by reflecting a pump correction value determined based on the temperature of the wire to a preset first pump rotation number in the correction mode when the first condition is satisfied.

4. The fuel cell system of claim 3, wherein the controller determines the control mode as the normal mode when neither of the first and second conditions is satisfied, and
the preset first pump rotation number is a value determined according to states of the plurality of electronic parts and the cooling water in the normal mode.

5. The fuel cell system of claim 3, wherein the controller determines the pump correction value at a next control time point by adding a value determined based on a difference between the temperature of the wire and a first reference temperature to the pump correction value.

6. The fuel cell system of claim 5, wherein the first reference temperature is determined based on output of a fuel cell stack, output of the DC-DC converter, and output of a bi-directional high voltage DC-DC converter (BHDC).

7. The fuel cell system of claim 3, wherein the controller corrects the number of rotations of the pump by adding the pump correction value to the preset first pump rotation number, and the pump correction value is a positive number and is determined to be less than or equal to a preset ratio of the preset first pump rotation number.

8. The fuel cell system of claim 2, wherein the controller corrects the number of rotations of the cooling fan by reflecting a cooling fan correction value determined based on the temperature of the cooling water to a preset first cooling fan rotation number in the correction mode when the second condition is satisfied.

9. The fuel cell system of claim 8, wherein the controller determines the control mode as the normal mode when neither of the first and second conditions is satisfied, and
the first cooling fan rotation number is a value determined according to states of the plurality of electronic parts and the cooling water in the normal mode.

10. The fuel cell system of claim 8, wherein the controller determines the cooling fan correction value at a next control time point by adding a value determined based on a difference between the temperature of the cooling water and a second reference temperature to the cooling fan correction value.

11. The fuel cell system of claim 10, wherein the second reference temperature is determined based on the temperature of the wire and output of the DC-DC converter.

12. The fuel cell system of claim 8, wherein the controller corrects the number of rotations of the cooling fan by adding the cooling fan correction value to the first cooling fan rotation number, and
the cooling fan correction value is a positive number and is determined to be less than or equal to a preset ratio of the first cooling fan rotation number.

13. The fuel cell system of claim 1, further comprising:
a wire temperature sensor configured to acquire the temperature of the wire; and
a cooling water temperature sensor configured to acquire a temperature of the cooling water.

14. The fuel cell system of claim 1, wherein the plurality of electronic parts include at least one of a BHDC, a blower pump control unit (BPCU), or a DC-DC converter.

15. The fuel cell system of claim 14, wherein the wire is connected to an output terminal of the DC-DC converter and includes a housing configured to block direct contact with the cooling water.

16. A method of controlling a fuel cell system, the method comprising:
determining a control mode based on a temperature of a wire, the wire being disposed inside a cooling line through which cooling water passing through a plurality of electronic parts circulates and configured to supply power to the plurality of electronic parts; and
controlling the number of rotations of a pump configured to pump the cooling water and the number of rotations of a cooling fan configured to cool the cooling water based on the control mode.

* * * * *